Figure 6:
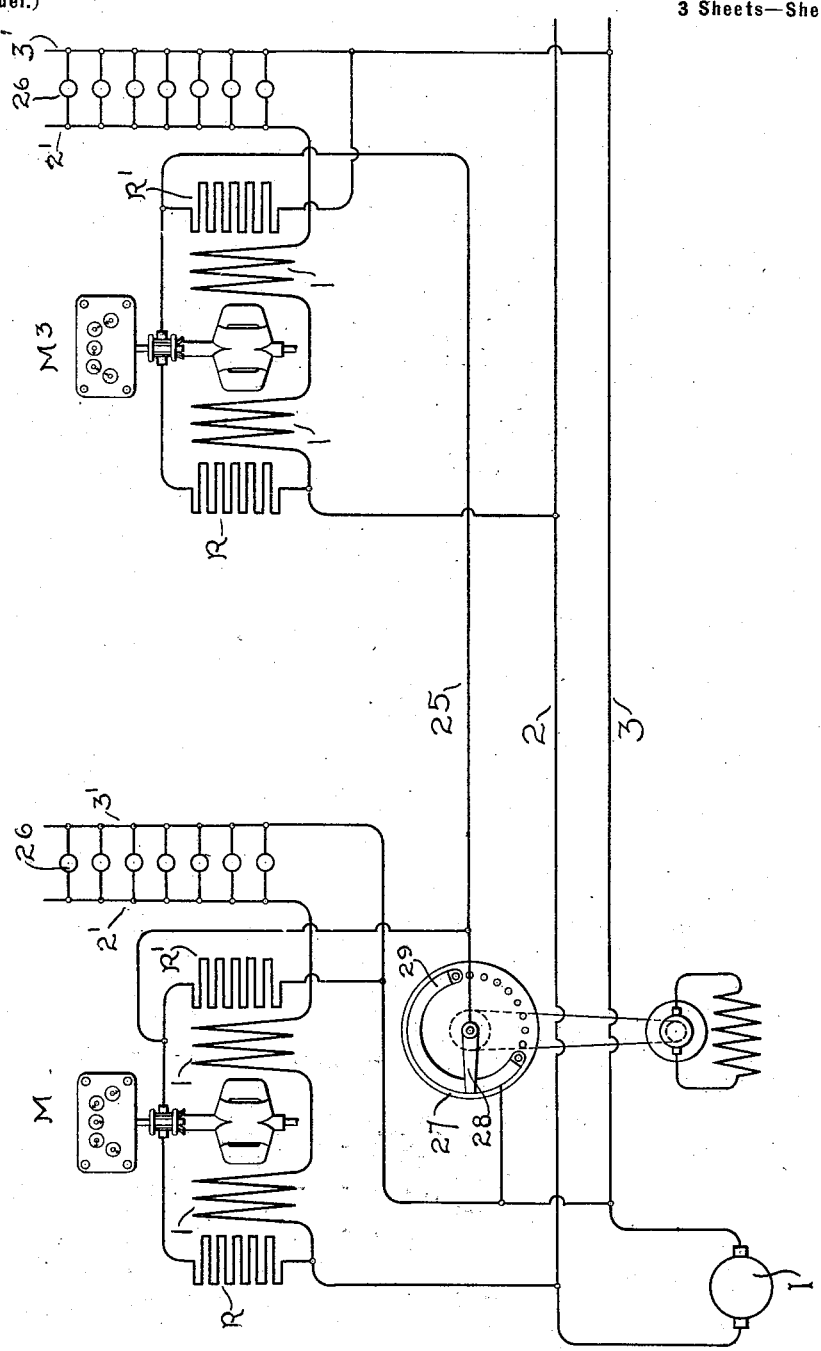

No. 710,070. Patented Sept. 30, 1902.
E. OXLEY.
APPARATUS FOR MULTIRATE METERING.
(Application filed Mar. 8, 1899.)
(No Model.) 3 Sheets—Sheet 1.
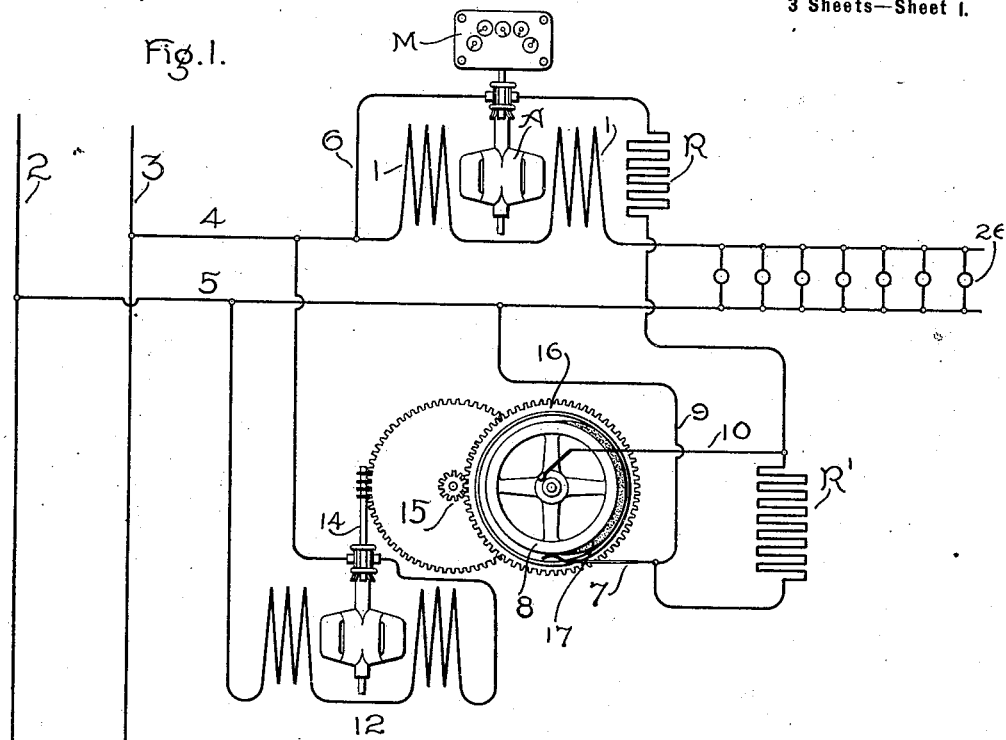
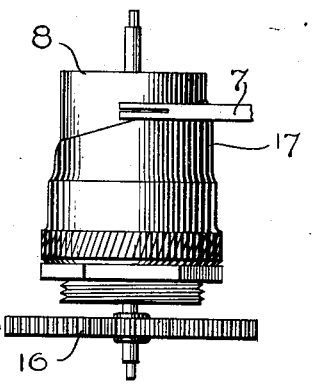
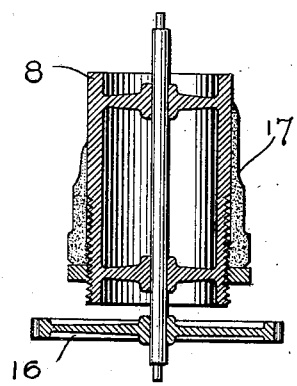
Witnesses.
Edw. Williams, Jr.
A. F. Macdonald.
Inventor.
Eustace Oxley,
by Albert G. Davis
Atty.

No. 710,070. Patented Sept. 30, 1902.
E. OXLEY.
APPARATUS FOR MULTIRATE METERING.
(Application filed Mar. 8, 1899.)
(No Model.) 3 Sheets—Sheet 2.
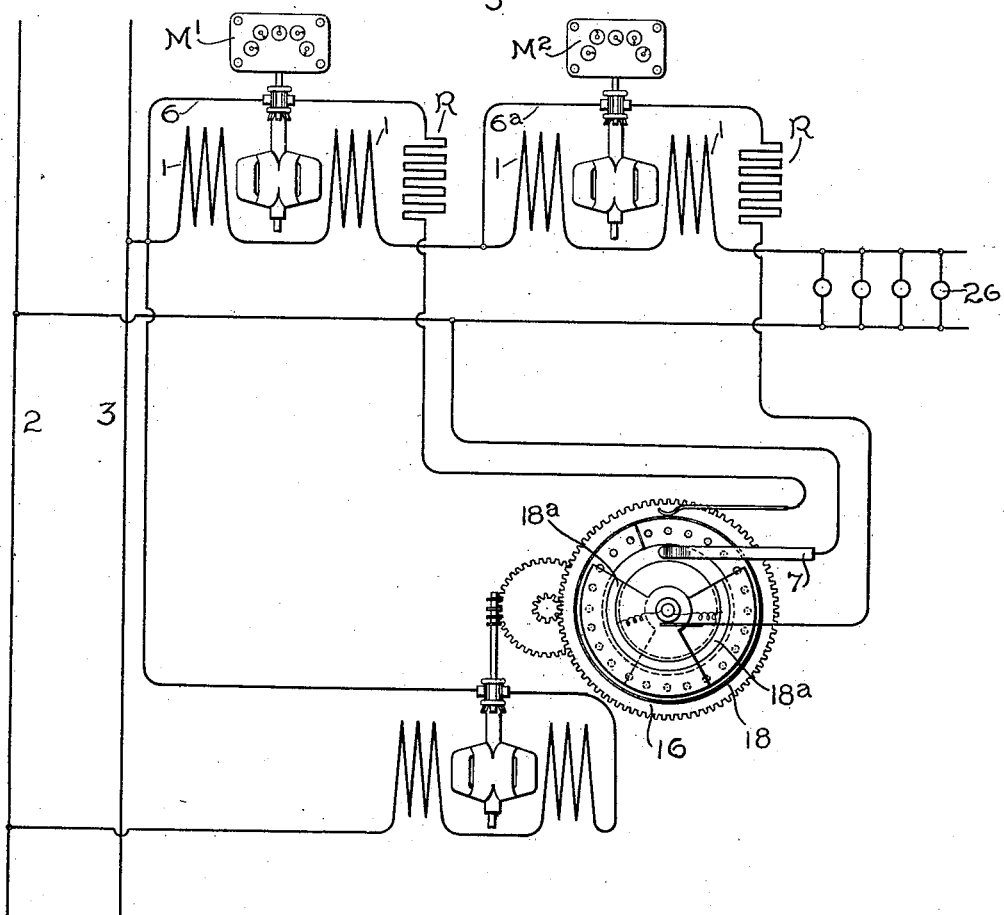
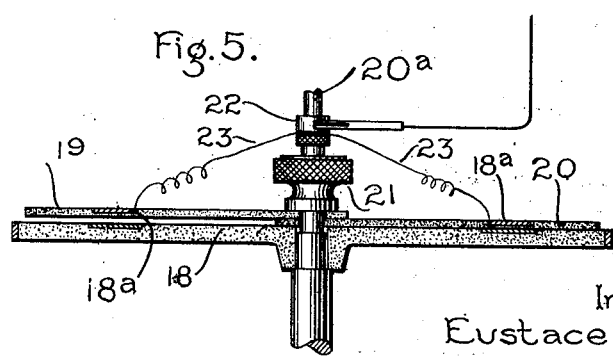
Witnesses.
Edw. Williams, Jr.
A. F. Macdonald.
Inventor,
Eustace Oxley,
by Albert G. Davis
Atty.

No. 710,070. Patented Sept. 30, 1902.
E. OXLEY.
APPARATUS FOR MULTIRATE METERING.
(Application filed Mar. 8, 1899.)
(No Model.) 3 Sheets—Sheet 3.

Witnesses.
Edw. Williams, Jr.
A. F. Macdonald.

Inventor.
Eustace Oxley,
by Albert G. Davis.
Atty.

UNITED STATES PATENT OFFICE.

EUSTACE OXLEY, OF LYNN, MASSACHUSETTS, ASSIGNOR TO THE GENERAL ELECTRIC COMPANY, A CORPORATION OF NEW YORK.

APPARATUS FOR MULTIRATE METERING.

SPECIFICATION forming part of Letters Patent No. 710,070, dated September 30, 1902.

Application filed March 8, 1899. Serial No. 708,173. (No model.)

*To all whom it may concern:*

Be it known that I, EUSTACE OXLEY, a citizen of the United States, residing at Lynn, county of Essex, State of Massachusetts, have invented certain new and useful Improvements in Apparatus for Multirate Metering, (Case No. 1,159,) of which the following is a specification.

My invention relates to apparatus for multirate metering of electric current. I have already been granted Letters Patent covering several methods for metering current at different rates during different periods of time, together with a variety of apparatus for practicing said methods and for controlling the shift from one rate to the other at every point of consumption from a single point, such as the generating-station. Circumstances may, however, render it very desirable to substitute for a system of single or central control a method of double-rate metering in which a local control is provided, or, in other words, a control which is exercised automatically at each point of consumption independently of every other point upon the line. It is the purpose of my present invention to provide a simple and economical apparatus for accomplishing this result which shall be practically free from the objections that have been encountered heretofore and also to provide a system which can be installed at a moderate expense and be operated with any type of metering mechanism and in connection with a single meter or with a plurality of meters at each point of consumption.

The invention consists to these ends in the novel mode of procedure and in the arrangement of apparatus and circuits for carrying the same into practice, as hereinafter fully explained and then particularly pointed out and defined in the claims which conclude this specification.

For the purposes of this description reference is made to the accompanying drawings, in which—

Figure 1 is a diagram showing a form of apparatus and an arrangement of circuits suitable for the practice of my invention. Fig. 2 is a detail view, in side elevation, showing a construction for varying the continuance of the periods of either rate. Fig. 3 is a central vertical section of the parts shown in Fig. 2. Fig. 4 is a diagram showing the invention applied to two meters which are operatively alternated with a modified form of time-controlling device. Fig. 5 is a central section of the time-controller shown in Fig. 4. Fig. 6 is a diagram showing a locally-controlled group of meters.

Heretofore a local control or a separate automatic apparatus at each point of consumption for controlling the time and effecting the shift from metering-current consumption at one rate to metering the consumption at a different rate has been attempted by the ordinary spring or weight driven clock mechanism suitably arranged with reference to each meter or each pair of meters, the differentiation of rates being obtained either by using the clock to cut one meter out and the other in at a predetermined hour or to insert a resistance in the armature-circuit of the meter, by which the current is cut down and the registering speed correspondingly reduced. This arrangement is to a certain extent satisfactory; but owing to the fact that it is necessary to send a man around at stated intervals to wind the clocks I prefer to substitute therefor some device which will receive its initial energy from the supply-mains. Such a device I have found in a small motor—as, for example, that which is found in a self-winding clock.

In my present invention I use any form of meter preferred, the type shown in the drawings being the ordinary Thomson recording-wattmeter having its dials operated by a revolving armature-shaft, the armature circuit or shunt receiving about one-tenth of an ampere of current, the reduction being effected by a resistance in said circuit. It should be understood, however, that I can without any modification employ any other type of meter, either mechanical or electrochemical, and also that a single meter controlled as to its speed or rate of registration during predetermined periods or a plurality of meters having operation in alternation or in any manner preferred can be used with my local-control method. It should be noted also that my local-control apparatus comprises any type of electromagnetic motor device capable of having a substantially equal rate of action in equal periods of time.

In explaining my improved apparatus for metering I have shown in Fig. 1 a single meter only, capable of retardation by the insertion at predetermined times of a resistance in the shunt-circuit, whereby the current in that circuit is cut down to a degree proportioned to the rate of retardation desired. The application of the invention to other types of metering mechanism will be obvious to any electrical engineer who is familiar with the prior art, and as an example I have in Fig. 4 illustrated the invention applied to two meters used in operative alternation.

The reference-sign M in Fig. 1 of the drawings indicates a metering mechanism, which is shown in this instance as being the ordinary form of Thomson recording-wattmeter having an armature A, arranged between the series coils 1 1 to drive initial dial of the registering-train.

The numerals 2 and 3 denote the mains of a system from which service-wires 4 and 5 are tapped off to a point of consumption. The shunt-circuit 6 includes the usual resistance R. This reduces the current in that circuit to the proper point, which in the present type of motor is usually one-tenth of an ampere.

Included in the shunt-circuit 6 is an additional resistance R' and a fixed brush 7, the elastic end of the latter resting upon a time-controller, consisting of a positively-driven conducting-cylinder 8. The brush 7 is connected by a wire 9 to the service-wire 5, and a wire 10 connects the cylinder 8 to the shunt-wire 6 at a point between the resistances R and R'. Thus if the brush 7 rests with electrical contact upon the cylinder 8 the current in the shunt-circuit will find a path over wires 4 and 6 through the armature A and resistance R, thence over the continuation of the wire 6 over wire 10 to the cylinder 8, thence to the brush 7 and over wire 9 to the service-wire 5. With this arrangement of circuit the second resistance R' is not included in the shunt-circuit. Should the brush 7 be removed, however, from electrical engagement with the cylinder 8, the current, being unable to pass from the cylinder to the brush, as before, is compelled to traverse the resistance R', from which it passes to the wire 9 and to the service-wire 5. By simply removing the brush 7, therefore, from the cylinder 8 the second resistance R' is inserted in or made part of the shunt-circuit of the meter, and by restoring said brush or permitting it to snap back to its position of rest upon the cylinder the resistance R' is cut out of or withdrawn from the meter-shunt. Said resistance is proportioned to the reduction in speed of the registering action which is required. For example, if the resistance is such that the normal potential is reduced one-half the registering action will be reduced in the same proportion, or practically so, and the meter will record only fifty per cent. or one-half of the current actually consumed during the time the second resistance R' continues to form a portion of the meter-shunt or armature-circuit. Reduced registration can be effected in any other proportion desired by merely varying the resistance introduced.

The next essential step is to provide means for controlling automatically the hour when the second resistance R' shall be included or inserted and the hour of its removal or withdrawal, the intervening hours being the periods of low rate or reduced rate. Evidently there are several simple and inexpensive methods of accomplishing this result and enabling the apparatus to be so regulated that the hour when the low-rate period begins can be changed and the duration of said period varied to any degree desired. To accomplish both these results, it is necessary that either the cylinder 8 or the brush 7 should have a practically equable movement one relatively to the other and that at predetermined points in the range of this movement the electrical engagement of said parts be interrupted and then at a subsequent hour restored. I effect these results in the following manner:

At a suitable point relatively to the position of the cylinder 8 I arrange a small electric motor 12, having any suitable construction, a slow-speed motor being preferable. This motor device is arranged in a shunt between the mains or, as shown in the drawings, between the service-wires 4 and 5. Its armature-shaft 14 is geared through an intermediate pinion 15 or in any suitable manner with a wheel 16, by which revolution is given to the cylinder 8, which may be carried by said wheel 16. The rate of this movement in the present instance is such as to give said cylinder one complete revolution in twenty-four hours; but where it is desired to modify the system any number of revolutions or even a part of a revolution may be given to the cylinder. The cylinder 8 may be wholly of conducting metal, or it may be provided with a conducting portion or strip, upon which the brush 7 may rest. In the one shown I mount on the outer surface of the cylinder a sleeve or sheath 17, formed of suitable non-conducting material—such, for example, as hard rubber—and capable of adjustment on the cylinder in parallelism with its axis of rotation. The end of the sheath is thin and is cut off at a bevel, as seen in Figs. 2 and 3. By adjusting it in one direction the beveled edge will be caused to intersect the line of contact of the brush 7 at a point in advance of the point of intersection previous to such adjustment, and vice versa. The adjustment can be made in any way, and I have shown the sheath threaded upon the cylinder, as one form of possible construction. I may, however, use the modified form of time-controller shown in Figs. 4 and 5, in which a disk 18 is mounted on the same shaft with the gear 16 in place of the cylinder. Upon the face of the disk I mount thin sector-plates 19 and 20, of non-conducting material capable of rotary adjustment upon a central pin or nipple $20^a$, on which is a thumb-screw 21 to lock the sectors at any point to which they are adjusted. By making the combined area of the sectors cover a suitable proportion of the disk measured upon its circumference the surface of the said disk left exposed by said sectors will be only that part which represents the period when full rate is charged. By turning the upper sector to cover or partly cover the lower one any desired additional part of the disk can be exposed. I may, however, use three or more of said sector-plates, if desirable, and thus by bringing all into superimposition all but a small portion of the face of the disk can be either covered by sectors or exposed. It might even be desirable for a certain purpose to completely cover the face of the disk and charge the low rate at all times. This of course would not ordinarily be done; but where the low rate was only intended for a few days, for example, it would be simpler than changing the permanent connections of the meter. The face of the disk can be divided into twenty-four or any desired number of equal spaces to serve as time divisions and to enable the inspector to set the apparatus in such manner that the hour when the low-rate period begins and the hour of its termination may be predetermined or changed in duration at any time to correspond with the season of the year or other circumstances.

The sectors 19 and 20 are quite thin, and their edges are beveled off to form inclined faces upon which the brush 7 will easily ride. As the sectors can be turned in either direction for adjustment, the brush can be caused to pass from the disk to the surface of the sector 20, which lies next to the disk, and thence it will ride over the edge of the superimposed sector 19, thus avoiding the more abrupt movement from the face of the disk to the surface of the outer sector. As the current in the meter-shunt is small, the rubbing contact of the brush 7 need not be such as to develop any material friction and the latter factor may be disregarded.

My invention is not dependent upon a rotating armature, since a device having reciprocatory motion either in rectilinear or rotary lines will fully serve the object at which I aim. The current in the motor-circuit will be quite small, not in excess in practice of the current in the shunt-circuit of the meter. The speed of the motor, whatever the type of the latter may be, can be retarded, if necessary, in any of the ways commonly employed for similar purposes.

In Fig. 4 I have shown two meters M' and $M^2$, connected to operate in alternation, the shunt-circuits 6 and $6^a$ being connected, respectively, to the disk 18 and to a conducting-strip $18^a$, which may be arranged upon the exterior faces of the sectors 19 and 20. Then as the brush 7 rides off the disk 18 upon said strip $18^a$ the shunt-circuit 6, connected to the former, is opened, and at the same moment the shunt $6^a$ of the second meter is closed.

In Fig. 5 I have shown the disk and sectors on a slightly-larger scale and have indicated one arrangement by which the shunt-circuit $6^a$ of the meter $M^2$ in Fig. 4 will be closed by the passage of the brush 7 off the disk 18 and upon the conducting-strip $18^a$ on the sectors 19 and 20. The end of the shunt-wire $6^a$ terminates in a brush which rests on the ring 22 on the spindle $20^a$, and wires or other suitable form of conductors 23 are led from the ring to the conducting-strips $18^a$. It will be understood, however, that there are many other means of accomplishing the same result and that my invention is not restricted to the particular devices shown. It should be noted also that although I have shown my present invention applied to two meters which are operatively alternated I have given this illustration as showing the capacity of the apparatus to be adapted to known methods of double-rate metering. The substitution of the disk 18 in place of the cylinder 8 in Fig. 1 will readily be made by any person who is familiar with the art.

In installing a system of electric metering in a large building or block of buildings it often happens that there are a good many customers to whom it would be desirable to furnish current at reduced rates during certain portions of the day. In an installation of this kind it sometimes happens that the expense of furnishing each separate consumer with a clock mechanism is unwarranted, owing to the small amount of current used. To overcome this objection, I employ a single motive device and locate it at any convenient point, the motive device being so arranged that all of the multirate meters in the building or group of buildings can be controlled thereby. In Fig. 6 I have illustrated such a system, in which 1 represents the generator, 2 and 3 the distribution-mains extending therefrom, and 25 the control-wire. The meters M and $M^3$ are supposed to be located in different rooms in the same building or in different buildings, as the case may be. For the purpose of illustration this is thought to be sufficient, since it can readily be understood that a large number of meters may be controlled in the same manner. The meters, as shown, are of the well-known type of Thomson recording-wattmeters and consist of a pair of field-magnets, an armature mounted for movement within the influence of the field-magnets, and a dial for recording the rotations of the armature. No means for retarding the rotation of the armatures is shown either in this figure or in the ones previously described; but it is to be understood that any one of the well-known means may be employed. Extending from the mains 2 and 3 are auxiliary or house mains 2' 3', which supply current to the translating device 26. The field-coils of each meter are connected in series with the main 2'. In circuit with the armature of each meter is a resistance R for decreasing the current flow therein. A second resistance R' is also connected in circuit with the armature and is arranged to be cut into and out of circuit by the controller 27 for the purpose of changing the rate of registration. The motor mechanism for driving the circuit-controller can be of the construction shown in Fig. 1 or Fig. 4, as desired. In order to simplify the drawings, I have shown the propelling-motor diagrammatically, with a belt connecting it with the circuit-controller. In an installation of this kind it is only necessary to install one of the circuit-controllers and a driving-motor, since the meters in the building or in a group of buildings can be connected as is meter $M^3$. The circuit-controller, as shown, consists of moving contact-arm 28, which is arranged to move over the segmental contact 29 and complete the circuit between the main 3 and the control-wire 25. With the circuits arranged as shown the meters are registering at the high rate. After the contact-arm 28 moves off of the segment 29 the current through the armature no longer passes through the control-wire 25 of the circuit-controller, but goes to the negative side of the system through the resistance R'. With this arrangement the amount of current flowing through the armature is decreased by an amount corresponding to the increase in resistance, and consequently the armature will rotate at a decreased speed. It is manifest that with this construction as many meters as desired may be connected to the control-wire 25 and their action controlled by the circuit-controller 27.

Having thus described my invention, what I claim as new, and desire to secure by Letters Patent of the United States, is—

1. In a metering system, the combination of supply-mains, a meter or meters for recording the amount of energy consumed at the various points of consumption, means capable of changing the rate of registration of the meters, and an automatic control apparatus operated by current derived from the system for actuating said means.

2. In a metering system, the combination of mains for supplying current to the consumers, meters for recording the consumption of energy, a resistance capable of being inserted in the circuit in a manner to change the rate of registration of the meters, and an automatic control apparatus operated by current received from the system for inserting and withdrawing the resistance from the circuit.

3. In a metering system, the combination of supply-mains, meters for recording the amount of energy consumed at the various points of consumption, a resistance device capable of changing the rate of registration of the meters, and automatically-actuated apparatus receiving current from the supply-mains for operating the resistance device.

4. In a system of electrical distribution, the combination with a suitable metering mechanism located at a single point of consumption, of a resistance capable of being inserted in and withdrawn from a circuit of said metering mechanism, and an automatic control apparatus operated by current derived from the system at said point of consumption, to insert and withdraw said resistance, at predetermined hours, substantially as described.

5. In a system of electrical distribution, the combination with a suitable metering mechanism installed at a single point of consumption, of a resistance capable of insertion in and withdrawal from the shunt-circuit of said metering mechanism, a time-controller, to vary the hour of insertion and withdrawal, and a motor-control operated by current derived from the system to actuate said time-controller continuously, after the latter is set, substantially as described.

6. In a system of electrical distribution, the combination with a suitable metering mechanism, of means for reducing the speed, or rate of registration of current, during predetermined hours, a time-controller capable of adjustment to fix said hours, and a local controller consisting of a motor continuously actuated by current derived from the system, substantially as described.

7. In a system of electrical distribution, the combination with a suitable metering mechanism located at a point of consumption, of a time-controller composed of two parts, one having constant movement relatively to the other, and a local motor-controller operated by current derived from the system to impart said movement, substantially as described.

8. In a system of electric metering, the combination of a plurality of meters located at the various points of consumption, each meter being arranged to register at more than one rate, and a single automatic control device operated by current received from the system for changing the rate at which the meters register.

9. In an electric metering system the combination of means for indicating the consumption of energy, two circuits controlling the recording apparatus, and an automatic control apparatus receiving current from the supply-lines for rendering either circuit operative.

In witness whereof I have hereunto set my hand this 3d day of March, 1899.

EUSTACE OXLEY.

Witnesses:
DUGALD McKILLOP,
HENRY O. WESTENDARP.